May 30, 1933. G. H. MEINZER 1,911,840
APPARATUS FOR TREATING EMULSIONS
Filed July 30, 1930 3 Sheets-Sheet 1

GOTTHOLD H. MEINZER
INVENTOR
ATTORNEY

May 30, 1933.  G. H. MEINZER  1,911,840
APPARATUS FOR TREATING EMULSIONS
Filed July 30, 1930  3 Sheets-Sheet 2

GOTTHOLD H. MEINZER
INVENTOR
Paul W. Prizeman
ATTORNEY

May 30, 1933.  G. H. MEINZER  1,911,840
APPARATUS FOR TREATING EMULSIONS
Filed July 30, 1930   3 Sheets-Sheet 3

GOTTHOLD H. MEINZER
INVENTOR
Paul W. Vrutman
ATTORNEY

Patented May 30, 1933

1,911,840

UNITED STATES PATENT OFFICE

GOTTHOLD HARRY MEINZER, OF LOS ANGELES, CALIFORNIA, ASSIGNOR TO L. BLAKE-SMITH, OF SAN FRANCISCO, CALIFORNIA

APPARATUS FOR TREATING EMULSIONS

Application filed July 30, 1930. Serial No. 471,626.

An object of my invention is to provide a means for breaking or resolving emulsions of oil and water in a continuous cycle.

An object of my invention is to provide an apparatus for continuously agitating and contacting a mixture of fluids, such as an emulsion of oil and water, with solid particles or a mixture of solid particles such as silica and pyrites, and for simultaneously separating and withdrawing from the mixture while under agitation the fluid components of the emulsion.

An object of my invention is to provide an apparatus for continuously removing from the agitating zone certain liberated emulsifying substances, simultaneously with the removal of the water and oil components of the emulsion, thus preventing the contamination of the surfaces of the mineral treating agents.

An object of my invention is to provide an apparatus for similarly removing from the agitating zone certain suspended colloidal solids which may be present in the emulsion.

An object of my invention is to provide an apparatus for continuously and preferentially separating and removing free water from a mixture of water, oil and mineral treating agents under agitation.

An object of my invention is to provide an apparatus adapted to prevent re-emulsification of water and oil separated from an emulsion during the withdrawal of these liquids from the separating portion of the apparatus.

The emulsions herein referred to consist of mixtures of oil and water, one of these liquids being very finely subdivided and its particles suspended or dispersed in a continuous mass of the other. In some cases the subdivision of the disperse phase is maintained merely by the adsorption of certain components of the continuous phase at the surfaces of the dispersed particles; in other cases viscous liquids, colloids or finely divided solids are present at the interfaces and form films or skins surrounding the liquid particles, preventing coalescence. Also in many cases finely divided solids (such as clay or shale in oil field emulsions) are mechanically entrained and suspended along with the emulsion particles proper. When such emulsions are broken by the penetration of the skins and the coalescence of the dispersed liquid particles we obtain as product a mixture of the two liquids, together with the material of the emulsion skin and any further solid matter which may be present, the dispersed liquid now being in drops or masses of such size as readily to separate from the continuous phase by sedimentation.

In the class of treatments to which my present invention is directed these emulsions are broken by contacting them simultaneously with two finely divided solid materials, one having a preferential surface attraction or "wettability" for water, the other a preferential attraction for oil. Numerous such materials are known and their selection and preparation are described in detail in my copending application entitled Method of resolving emulsions, filed July 30, 1930, under Serial No. 471,627. For the purpose of describing the functioning of my present invention it is sufficient to say that serpentine, asbestos, mica, glass, calcite, barite, and quartz (or sand) are suitable water-wettable materials while magnetite, pyrite (or artificially prepared iron sulfid), galena, copper, antimony and silver are suitable oil wettable materials. Where further reference is made to quartz and to pyrite it will be understood that the other materials mentioned are grouped with them.

For the purpose of my invention a substance belonging to each of the groups is reduced to a rather fine state of comminution, for example such as will pass an 80 mesh screen and be retained on a screen of 100 mesh. For reasons which will appear it is desirable that fines should be eliminated so far as possible.

These substances have, so far as is known, no material chemical action on any of the constituents of the emulsion and function by drawing apart the aqueous and the oleaginous elements and coalescing them into masses of such size as will readily stratify. If kept clean and free from accumulations of colloidal emulsifying agents or other incidental bodies, the solids may be retained in the apparatus and will continue to function indefinitely.

With this explanation, the objects and advantages of my invention will be evident from an inspection of the attached drawings and the following description thereof, in which Fig. 1 is a vertical elevation of a preferred form of my apparatus, parts being broken away to show the internal construction thereof;

Figure 1:
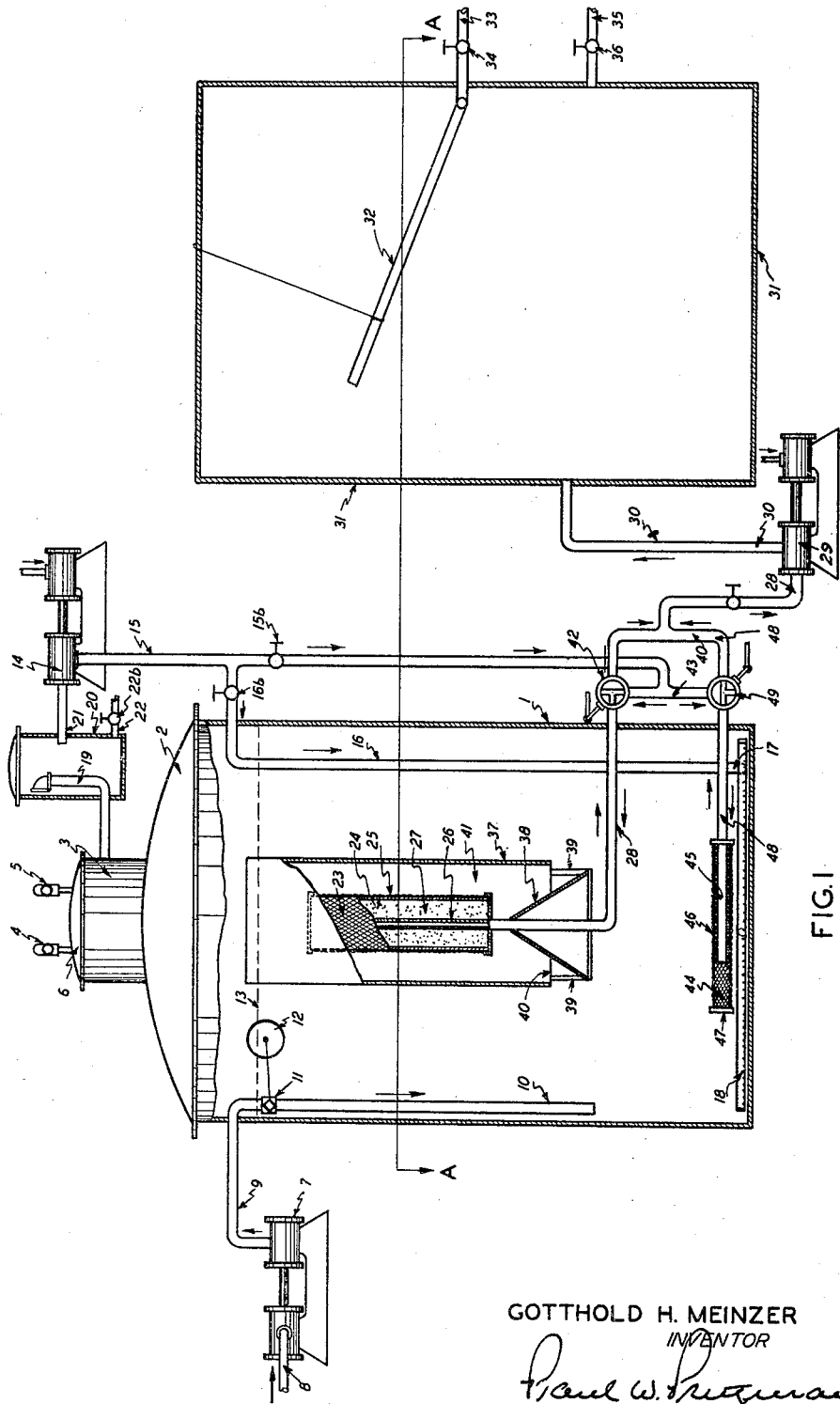

Referring to the drawings, 1 is a vapor-tight tank or treating chamber, having a cover 2 and surmounted by a dome 3. To this dome it is desirable to attach a pressure relief valve 4 and a vacuum relief valve 5. The finely divided mineral used in the treatment may be inserted by removing the dome cover 6.

A feed pump 7 takes suction through a pipe 8 on a tank or other source of supply of emulsion or emulsified oil not shown, and delivers this raw material into tank 1 through a pipe 9 which terminates at approximately the level indicated at 10. An automatic float valve consisting of a cock or valve 11 actuated by a float 12 may be used to maintain the liquid within the tank at some desired level, as that indicated by the line 13.

The contents of the tank, which will be a mixture of emulsion with the solid pulverized reagents, may be kept in agitation in any desired manner, as by mechanical agitation with paddles or by circulation through pumps drawing from and discharging into the tank. I prefer however to agitate by means of circulated compressed air or gas.

For this purpose I provide an air compressor or blower 14 which discharges into a pipe 15 controlled by a valve 15b and thence to a branch pipe 16 controlled by a valve 16b. The latter in turn supplies a distributing manifold 17 which communicates with a series of perforated pipes 18—18, best shown in Fig. 2, which are placed on the bottom of the tank and through which the air or gas is uniformly distributed over the area of the tank.

The supply of gas or air is drawn from the dome 3 through a pipe 19 into a liquid-trap 20, where any condensed vapors are separated, and thence through a pipe 21 into the suction of the compressor. Condensed water and light fractions collecting in the trap may be withdrawn at intervals through a pipe 22 having a valve 22—b, and thus kept from entering the compressor. This arrangement is a safety measure only and has no direct connection with the working of the apparatus.

The main separating unit 23 is composed of a perforated shell 24 and a separating membrane or screen 25 supported thereby. This membrane may consist of a woven wire screen, a slotted or punched plate screen or any of the standard filter cloths, either wire or fabric. The size of the apertures in this membrane is governed by the nature of the emulsion treated and by the size to which the mineral reagent is reduced. The apertures must be small enough to retain the reagents and large enough to allow any colloidal or very fine incidental solids to pass through the openings and out of the treater. The purpose of the assembly is to permit the withdrawal of the separated constituents of the emulsion while retaining the mineral reagents.

Within the separating membrane is placed a vertical perforated drawoff pipe 26. Between this pipe and the perforated shell 24 I prefer to form a loosely packed layer 27 of a coarsely granular material, which may be either a preferentially water-wettable material such as quartz, or a mixture of such material with an oil-wettable material such as pyrites. The object of this pack is to reseparate any emulsion which may, in some cases, be formed in the passage of the constituents through the separating membrane and also to prevent re-emulsification. It also produces the final resolution of any traces of emulsion which may be carried forward with the separated products.

The drawoff pipe 26 delivers the constituents of the emulsion, intermixed but not emulsified, into a pipe 28 through which they pass into the suction of a pump 29 and are thence delivered through a pipe 30 into an outside settling tank 31. This tank may be provided with a swing pipe 32 communicating with a drain pipe 33 having a valve 34, for withdrawing the upper oil layer, and with a lower drawoff pipe 35 controlled by a valve 36 for withdrawing the aqueous layer and any solids which it may contain. The mixture of separated constituents discharged into this tank rapidly stratifies into the layers described.

Around the separating assembly 23 I place a cylindrical baffle 37, open top and bottom, and below this a baffle cone 38. The cone may be attached to pipe 28 and the baffle attached to the cone by means of the posts 39 or otherwise as may be convenient, but in any case the cone does not fill the lower end of the cylinder, an annular opening 40 being left for admitting fluid into the space 41 between the baffle and the separator.

The object of the baffle 37 and the cone 38 is to prevent the agitating gas from entering the separator and passing thence into the suction of pump 29, and further to afford a zone of quiescence around the separator. By this means gas-locking of the pump is prevented and its continuous action ensured.

As the upper end of the baffle projects above the oil level in the tank, a material amount of sedimentation of mineral takes place within the baffle and the quantity brought into contact with the membrane is correspondingly reduced, thus reducing the rate of accumulation of sediment on the membrane 25 and prolonging the period between cleanings.

The membrane being a filter will gradually choke through accumulation of solids on its outer surface. When this condition arises the two-way valve 42 is momentarily thrown into such position as to shut off communication between pipe 28 and pump 29 and to admit gas under pressure from compressor 14, through pipes 15 and 43. This gas passing into the interior of the separator causes the cake of sediment to slough off and drop to the bottom of the tank.

For the purpose of draining the treating tank of fluid and to permit it to be kept in operation while the membrane is being cleaned as above, I provide the auxiliary separator 44 located just above the distributing pipes 18 and near the bottom of the tank. This separator is provided with a perforated screen 45 surrounded by a membrane 46, the outer end of this assembly being closed as at 47 and the inner end communicating through a pipe 48, with pipe 28 and thus with the suction of pump 29. This separator may also desirably be provided with a gas inlet connection from pipe 43 and a two-way cock 49 by means of which the membrane 46 may be cleaned. By the use of this dual connection the continued operation of the apparatus is made possible.

Figure 2:
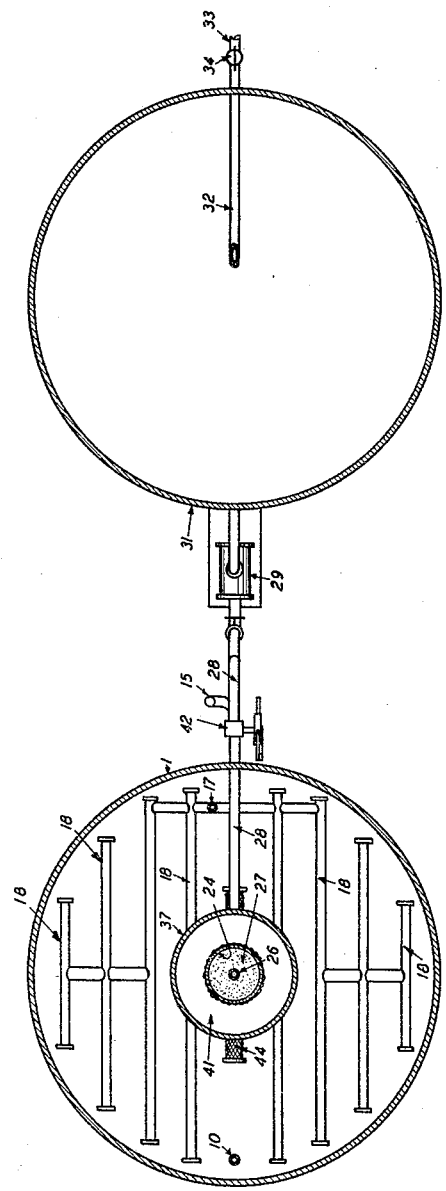
Fig. 2 is a horizontal section through the same apparatus on the line A—B of Fig. 1.

The apparatus of Figs. 1 and 2 functions in the following manner. A sufficient charge of the solid reagent is placed in tank 1 which is then filled with emulsified oil to the level 13 by means of pump 7. Compressor 14 is then started and the contents of the tank are agitated until thoroughly mixed and the agitation continued until the emulsion is broken. At this stage the tank contains free oil suspending coarse globules of water and also all the reagent.

Pump 29 is then started and pump 7 continues to deliver into the tank a sufficient quantity of emulsified oil to replace the fluid withdrawn. This emulsion mixes with the separated fluids in the tank and is itself continuously resolved. The intermixed but not emulsified fluids gradually pass into the quiet zone 41 in which a material proportion of the relatively heavy solids drop out and pass to the bottom of the tank, where they are caught up and again suspended.

The fluids and such colloidal or very fine solid matter as they may carry pass through the filtering membrane and thence to settling tank 31. The filter being much more permeable to water than to oil, because of the lower viscosity of water as compared to oil, tends constantly to withdraw water from the mixture in preference to oil, and thus the free water is withdrawn as fast as it is set free and its proportion in the mixture held at a desirable minimum. The solids accumulating on the membrane are cleaned off from time to time and are thus retained in the apparatus and in full function for an indefinite time.

Figure 3:
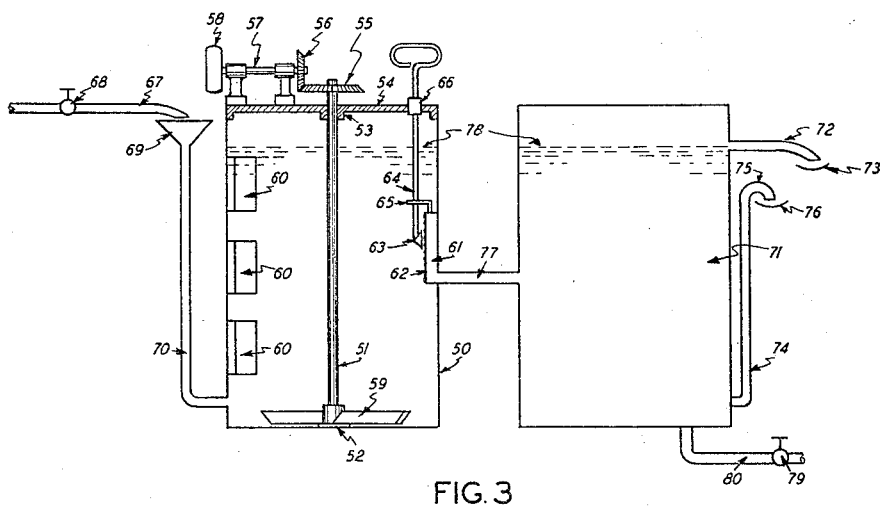
Fig. 3 is a horizontal section through a simplified form of apparatus, in which the principles of the first form are embodied.
Figure 4:
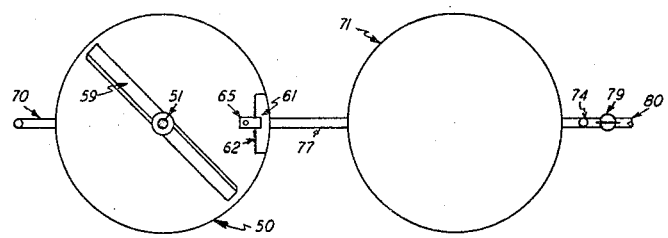
Fig. 4 is a plan of the same modification.

Referring to Figs. 3 and 4, 50 is a vertical cylindrical tank which may be open or closed as preferred; in the drawings it is shown as open. A vertical shaft 51 is centrally placed within this tank and is supported by the bearings 52 and 53, the latter being positioned by the cross arm 54. To the upper end of this shaft I attach a bevel gear 55, driven by a pinion 56 which in turn is carried on a shaft 57 and revolved by means of a pulley 58 from any convenient source of power not shown.

To the lower end of the shaft and just clear of the bottom of the tank I affix a scraper or paddle 59 for keeping the contents of the tank in agitation and to the sides of the tank, at convenient points, a number of baffles 60—60 to prevent the fluid contents of the tank from revolving.

On one side of the tank, or elsewhere within it as may be preferred, I form a pocket or chamber 61 of which one side is left open. Over this open side I fasten, in any convenient manner, a fine screen or filter 62, which should be flat and preferably fixed in a substantially vertical position. This filter may be made of woven wire screen or slotted or punched plate screen or even of filter cloth; it should be as coarse as the mesh of the treating agents will permit and should be so supported, as by an underlying perforated plate, as to maintain a flat surface. A scraper 63 attached to a hand rod 64 is positioned in contact with the flat filtering surface by means of a bracket 65 and a sleeve 66. By a vertical movement of this scraper which may be manual or automatic, any accumulation of sediment on the filter may be removed.

The treating tank 50 is supplied with the emulsion to be treated by means of a pipe 67 controlled by a valve 68 and communicating with any source of supply not shown. The discharge from this pipe may pass directly into the tank or it may enter a funnel 69 affixed to the upper end of a pipe 70 which enters the tank at its lower end. The point of entry of emulsion should be located as far as feasible from the location of the filter element.

A separating tank 71 which may be of generally similar dimensions to those of tank 50 is placed closely adjacent the latter. It is desirable that the tops of these two tanks should be substantially at the same level and if they are both closed an air connection should be made between their upper ends. If the separating tank is closed it should have a small vent to the atmosphere. From the upper part of the side of this tank an overflow pipe 72 conducts separated oil into a launder 73 by which it may be carried to any point of disposition of purified oil, while from the lower part of the side a riser pipe 74, turned outwardly at its upper end as indicated at 75, conducts separated water into a launder 76 by which it may be conducted to any drain. By making the overflow level of pipe 74 slightly lower than that of pipe 72 the difference in weight between the column of water in the former and the combined water and oil column in the tank may be offset and, if the size of the tank is sufficient to permit complete separation, the two overflows will continuously discharge each its appropriate liquid without attention.

A pipe 77 is arranged to communicate between the interior of the chamber 61 and the interior of tank 71. This pipe should be of relatively large diameter and as it is submerged at all times the mixture of separated liquids will be conducted through it without turbulence.

The operation of this apparatus is as follows. Emulsion entering through pipe 70 is intermixed with the contents of tank 50, which are automatically maintained at the level 78 fixed by the overflow pipe 72. The suspended solid reagents cause the resolution of this emulsion as fast as it enters. The products of this resolution pass through the filter 62, carrying any fine solid or colloidal matter and leaving the coarser reagent material behind. This reagent remains permanently in the treating tank and will treat an indefinite amount of emulsion. The separated constituents flow gently into the separating tank, the oil rises to the surface and overflows through pipe 72, the water sinks and overflows through pipe 74, and any mud which may collect at the bottom of the separating tank may be withdrawn from time to time by opening valve 79 in drain pipe 80.

The chamber 61 may desirably be filled with a loose pack of the treating solids, as described above, and any other or preferred means for cleaning its surface may be substituted for the simple scraper shown.

It is entirely possible to break the emulsion by simple agitation with the described materials in an open tank, to settle or filter the minerals from the separated fluids with any preferred type of filter and to return the minerals to the tank to treat another batch of emulsion. By making the withdrawal, feed, filtration and return of minerals continuous such an apparatus may be made to function continuously. The advantages of the apparatus here described are: first, that the system being closed and the same air or gas being continuously circulated, the oil is not evaporated or oxidized by the gas or air which is passed through it for agitation; second, that a zone of quiescence being formed about the filtering element the quantity of solid to be filtered from the separated liquids is greatly reduced; third, that the filter being placed within the treating tank, no abrasive material has to be handled through a pump and the solid matter is retained in the tank at all times and does not have to be returned thereto. In a process such as this, where there is no cost for treating material (once a sufficient supply is introduced) and where commercial requirements are such that the treatment must be conducted with the most extreme economy of labor and power in order to be competitive, these advantages are highly material and important.

I claim as my invention:

1. Apparatus for treating emulsions with pulverulent solids, comprising: a substantially closed vessel; means for continuously introducing emulsion into said vessel; means for maintaining a constant liquid level within said vessel; means for introducing streams of gas into said vessel for agitating the contents thereof; a filter situated below the upper liquid level within said vessel; outlet means for resolution products of said emulsion communicating with said filter; a pack of pulverulent solid emulsion-resolving material interposed between said filter and said outlet means; a baffle surrounding said filter and adapted to produce a zone of quiescence thereabout; a shield situated below said baffle and adapted to prevent gas entering said zone and to permit solids to pass downwardly out of said zone; means for withdrawing said gas from above said liquid level and for returning said gas to said gas introduction means; means for withdrawing condensed vapors from said gas prior to said return; a second filter situated within said vessel and a second outlet means communicating with said second filter; means for optionally withdrawing said resolution products through either of said outlet means; and means for passing said returning gas into the interior of either said filter to displace accumulated solid matter from the exterior of either said filter.

2. Apparatus for treating emulsions with pulverulent solids, comprising: a substantially closed vessel; means for continuously introducing emulsion into said vessel; means for maintaining a constant liquid level within said vessel; means for introducing streams of gas into said vessel for agitating the contents thereof; a filter situated below the upper liquid level within said vessel; outlet means for resolution products of said emulsion communicating with said filter; a pack of pulverulent solid emulsion-resolving material interposed between said filter and said outlet means; a baffle surrounding said filter and adapted to produce a zone of quiescence thereabout; a shield situated below said baffle and adapted to prevent gas entering said zone and to permit solids to pass downwardly out of said zone; means for withdrawing said gas from above said liquid level and for returning said gas to said gas introduction means; a second filter situated within said vessel and a second outlet means communicating with said second filter; means for optionally withdrawing said resolution products through either of said outlet means; and means for passing said returning gas into the interior of either said filter to displace accumulated solid matter from the exterior of either said filter.

3. Apparatus for treating emulsions with pulverulent solids, comprising: a substantially closed vessel; means for continuously introducing emulsion into said vessel; means for introducing streams of gas into said vessel for agitating the contents thereof; a filter situated below the upper liquid level within said vessel; outlet means for resolution products of said emulsion communicating with said filter; a pack of pulverulent solid emulsion-resolving material interposed between said filter and said outlet means; a baffle surrounding said filter and adapted to produce a zone of quiescence thereabout; a shield situated below said baffle and adapted to prevent gas entering said zone and to permit solids to pass downwardly out of said zone; means for withdrawing said gas from above said liquid level and for returning said gas to said gas introduction means; and means for passing said returning gas into the interior of said filter to displace accumulated solid matter from the exterior thereof.

4. Apparatus for treating emulsions with pulverulent solids, comprising: a vessel adapted to maintain a body of said emulsion; means for continuously introducing emulsion into said vessel; means for introducing streams of gas into said vessel for agitating the contents thereof; outlet means for resolution products of said emulsion communicating with the interior of said vessel; a baffle surrounding said outlet means and adapted to produce a zone of quiescence thereabout, and a shield situated below said baffle and adapted to prevent gas entering said zone and to permit solids to pass downwardly out of said zone.

5. Apparatus for treating emulsions with pulverulent solids, comprising: a substantially closed vessel; means for continuously introducing emulsion into said vessel; means for introducing streams of gas into said vessel for agitating the contents thereof; a filter situated below the upper liquid level within said vessel; outlet means for resolution products of said emulsion communicating with said filter; means cooperating with said filter for resolving any emulsion which may pass from said filter toward said outlet means; a baffle surrounding said filter and adapted to produce a zone of quiescence thereabout; a shield situated below said baffle and adapted to prevent gas entering said zone and to permit solids to pass downwardly out of said zone; means for withdrawing said gas from above said liquid level and for returning said gas to said gas introduction means; and means for displacing accumulated solids from the exterior of said filter.

6. Apparatus for treating emulsions with pulverulent solids, comprising: a substantially closed vessel; means for continuously introducing emulsion into said vessel; means for introducing streams of gas into said vessel for agitating the contents thereof; a filter situated below the upper liquid level within said vessel; outlet means for resolution products of said emulsion communicating with said filter; means cooperating with said filter for resolving any emulsion which may pass from said filter toward said outlet means; means for producing a zone of quiescence about said filter, said means being adapted to permit solids to pass downwardly out of said zone; means for withdrawing said gas from above said liquid level and for returning said gas to said gas introduction means; and means for displacing accumulated solids from the exterior of said filter.

7. Apparatus for treating emulsions with pulverulent solids, comprising: a vessel adapted to maintain a body of said emulsion; means for continuously introducing emulsion into said vessel; means for introducing streams of gas into said vessel for agitating the contents thereof; a filter situated below the upper liquid level within said vessel; outlet means for resolution products of said emulsion communicating with said filter; means cooperating with said filter for resolving any emulsion which may pass from said filter toward said outlet means; means for producing a zone of quiescence about said filter, said means being adapted to permit solids to pass downwardly out of said zone; and means for displacing accumulated solids from the exterior of said filter.

8. Apparatus for treating emulsions with pulverulent solids, comprising: a substantially closed vessel; means for continuously introducing emulsion into said vessel; means for introducing streams of gas into said vessel for agitating the contents thereof; a filter situated below the upper liquid level within said vessel; outlet means for resolution products of said emulsion communicating with said filter; means for producing a zone of quiescence about said filter, said means being adapted to permit solids to pass downwardly out of said zone; means for withdrawing said gas from above said liquid level and for returning said gas to said gas introduction means; and means for displacing accumulated solids from the exterior of said filter.

9. Apparatus for treating emulsions with pulverulent solids, comprising: a vessel adapted to maintain a body of said emulsion; means for continuously introducing emulsion into said vessel; means for introducing streams of gas into said vessel for agitating the contents thereof; a filter situated below the upper liquid level within said vessel; outlet means for resolution products of said emulsion communicating with said filter; means for producing a zone of quiescence about said filter, said means being adapted to permit solids to pass downwardly out of said zone; and means for displacing accumulated solids from the exterior of said filter.

10. Apparatus for treating emulsions with pulverulent solids, comprising: a substantially closed vessel; means for continuously introducing emulsion into said vessel; means for introducing streams of gas into said vessel for agitating the contents thereof; a filter situated below the upper liquid level within said vessel; outlet means for resolution products of said emulsion communicating with said filter; means cooperating with said filter for resolving any emulsion which may pass from said filter toward said outlet means; means for withdrawing said gas from above said liquid level and for returning said gas to said gas introduction means; and means for displacing accumulated solids from the exterior of said filter.

11. Apparatus for treating emulsions with pulverulent solids, comprising: a vessel adapted to maintain a body of said emulsion; means for continuously introducing emulsion into said vessel; means for introducing streams of gas into said vessel for agitating the contents thereof; a filter situated below the upper liquid level within said vessel; outlet means for resolution products of said emulsion communicating with said filter; means cooperating with said filter for resolving any emulsion which may pass from said filter toward said outlet means; and means for displacing accumulated solids from the exterior of said filter.

12. Apparatus for treating emulsions with pulverulent solids, comprising: a substantially closed vessel; means for continuously introducing emulsion into said vessel; means for introducing streams of gas into said vessel for agitating the contents thereof; a filter situated below the upper liquid level within said vessel; outlet means for resolution products of said emulsion communicating with said filter; means for withdrawing said gas from above said liquid level and for returning said gas to said gas introduction means; and means for displacing accumulated solids from the exterior of said filter.

13. Apparatus for treating emulsions with pulverulent solids, comprising: a vessel adapted to maintain a body of said emulsion; means for continuously introducing emulsion into said vessel; means for maintaining a constant liquid level within said vessel; means for agitating the contents of said vessel; a filter situated below the upper liquid level within said vessel; outlet means for resolution products of said emulsion communicating with said filter; a pack of pulverulent solid emulsion-resolving material interposed between said filter and said outlet means; a baffle surrounding said filter and adapted to produce a zone of quiescence thereabout; a shield situated below said baffle and adapted to permit solids to pass downwardly out of said zone; a second filter situated within said vessel and a second outlet means communicating with said second filter; means for optionally withdrawing said resolution products through either of said outlet means; and means for passing gas under pressure into the interior of either said filter to displace accumulated solid matter from the exterior of either said filter.

14. Apparatus for treating emulsions with pulverulent solids, comprising: a vessel adapted to maintain a body of said emulsion; means for continuously introducing emulsion into said vessel; means for maintaining a constant liquid level within said vessel; means for agitating the contents of said vessel; a filter situated below the upper liquid level within said vessel; outlet means for resolution products of said emulsions communicating with said filter; a pack of pulverulent solid emulsion-resolving material interposed between said filter and said outlet means; a baffle surrounding said filter and adapted to produce a zone of quiescence thereabout; a shield situated below said baffle and adapted to permit solids to pass downwardly out of said zone; and means for passing gas under pressure into the interior of said filter to displace accumulated solids from the exterior of said filter.

15. Apparatus for treating emulsions with pulverulent solids, comprising: a vessel adapted to maintain a body of said emulsion; means for continuously introducing emulsion into said vessel; means for agitating the contents of said vessel; a filter situated below the upper liquid level within said vessel; outlet means for resolution products of said emulsion communicating with said filter; a pack of pulverulent solid emulsion-resolving material interposed between said filter and said outlet means; a baffle surrounding said filter and adapted to produce a zone of quiescence thereabout; a shield situated below said baffle and adapted to permit solids to pass downwardly out of said zone; and means for displacing accumulated solids from the exterior of said filter.

16. Apparatus for treating emulsions with pulverulent solids, comprising: a vessel adapted to maintain a body of said emulsion; means for continuously introducing emulsion into said vessel; means for agitating the contents of said vessel; a filter situated below the upper liquid level within said vessel; outlet means for resolution products of said emulsion communicating with said filter; means cooperating with said filter for resolving any emulsion which may pass from said filter toward said outlet means; a baffle surrounding said filter and adapted to produce a zone of quiescence thereabout; a shield situated below said baffle and adapted to permit solids to pass downwardly out of said zone; and means for displacing accumulated solids from the exterior of said filter.

17. Apparatus for treating emulsions with pulverulent solids, comprising: a vessel adapted to maintain a body of said emulsion; means for continuously introducing emulsion into said vessel; means for agitating the contents of said vessel; a filter situated below the upper liquid level within said vessel; outlet means for resolution products of said emulsion communicating with said filter; means cooperating with said filter for resolving any emulsion which may pass from said filter toward said outlet means; means for producing a zone of quiescence about said filter, said means being adapted to permit solids to pass downwardly out of said zone; and means for displacing accumulated solids from the exterior of said filter.

18. Apparatus for treating emulsions with pulverulent solids, comprising: a vessel adapted to maintain a body of said emulsion; means for continuously introducing emulsion into said vessel; means for agitating the contents of said vessel; a filter situated below the upper liquid level within said vessel; outlet means communicating with said filter; means for producing a zone of quiescence about said filter, said means being adapted to permit solids to pass downwardly out of said zone; and means for displacing accumulated solids from the exterior of said filter.

19. Apparatus for treating emulsions with pulverulent solids, comprising: a vessel adapted to maintain a body of said emulsion; means for continuously introducing emulsion into said vessel; a filter situated below the upper liquid level in said vessel; outlet means for resolution products of said emulsion communicating with said filter; a body of said solids maintained in said outlet means for resolving any emulsion which may pass from said filter into said outlet means, and means for displacing accumulated solids from the exterior of said filter.

20. Apparatus for treating emulsions with pulverulent solids, comprising: a vessel adapted to maintain a body of said emulsion; means for continuously introducing emulsion into said vessel; a filter of woven fabric situated below the upper liquid level within said vessel; outlet means for resolution products of said emulsion communicating with said filter, and means for displacing accumulated solids from the exterior of said filter.

In witness that I claim the foregoing I have hereunto subscribed my name this 2nd day of July, 1930.

GOTTHOLD HARRY MEINZER.